United States Patent [19]

Collins et al.

[11] 4,007,973
[45] Feb. 15, 1977

[54] FLUID BEARINGS

[76] Inventors: Roger Bernard Collins, 187 Cutlers Place; Jonathan Anthony Henry Key, Craigie Lea, Croft Close, Corfemullen, both of Wimbourne, Dorset, England

[22] Filed: Mar. 11, 1974

[21] Appl. No.: 449,907

[30] Foreign Application Priority Data

Mar. 20, 1973 United Kingdom ............ 13183/73

[52] U.S. Cl. .............................................. 308/9
[51] Int. Cl.² ...................................... F16C 17/16
[58] Field of Search ............ 308/9, DIG. 1, DIG. 8, 308/72

[56] References Cited

UNITED STATES PATENTS

| | | | |
|---|---|---|---|
| 3,242,721 | 3/1966 | Trogman | 308/DIG. 1 |
| 3,647,272 | 3/1972 | Dee | 308/9 |
| 3,685,875 | 8/1972 | Dee | 308/9 |
| 3,726,572 | 4/1973 | Beadmore | 308/DIG. 1 |
| 3,827,766 | 8/1974 | Watt | 308/9 |

Primary Examiner—M. Henson Wood, Jr.
Assistant Examiner—Gene A. Church

[57] ABSTRACT

A bearing member, for incorporating in a fluid rotary bearing intended for use at speeds in excess of the "half-speed whirl" speed of a solidly mounted bearing, is a solid or composite substantially annular body made of or including material of which the tensile modulus and the specific gravity lie within defined ranges such that while remaining structurally stiff and dimensionally accurate the body is capable of absorbing energy and thus reducing or eliminating vibration and "whirl" in the bearing. The annular member may have radially projecting abutments to serve as sealing means, and these may be resiliently deformable, and may be axially spaced to define a zone communicating with the bearing face of the bearing member thereby to serve as a plenum chamber.

8 Claims, 5 Drawing Figures

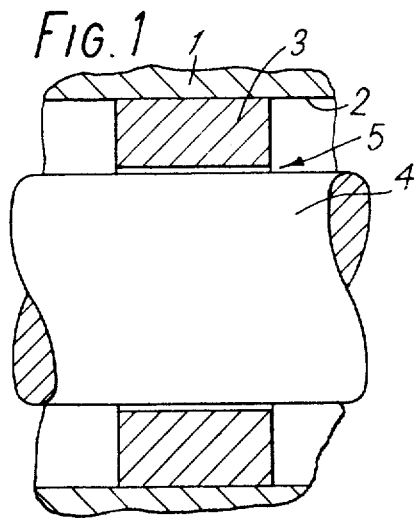
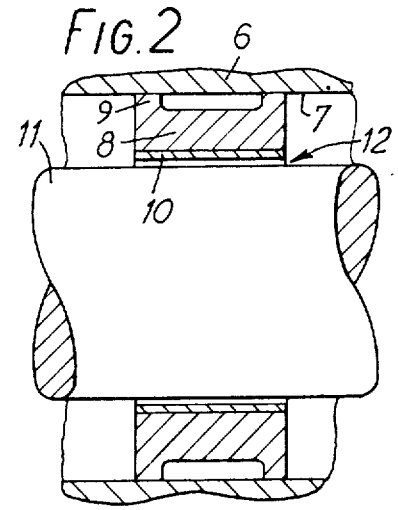
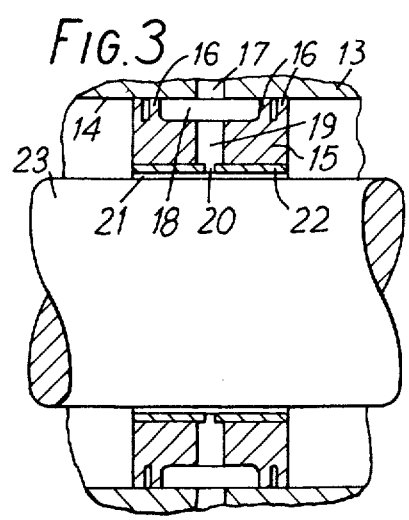
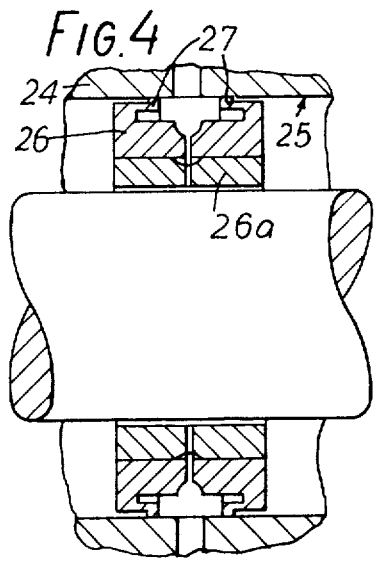
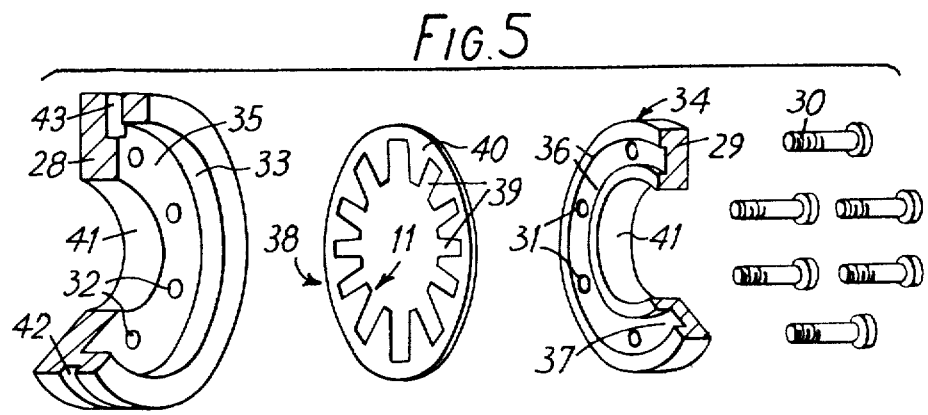

FLUID BEARINGS

This invention relates to fluid bearings.

Such bearings can suffer, under certain circumstances of fluid pressure, speed of rotation and load, from an effect well-known in the art as "half speed whirl" and this invention relates exclusively to bearings operating at speeds in excess of the "half speed whirl" speed for an equivalent solidly mounted bearing. It is also known that the tendency towards bearing whirl can be reduced or suppressed by supporting the rigid outer member of the bearing in a resilient mounting such that the mounting may absorb sufficient energy to prevent the development of a resonant oscillation of sufficient amplitude to lead to catastrophic failure. By way of example, it is already known to support the bearing outer member in O-rings made of relatively soft material such as rubber or synthetic resinous plastics.

A major disadvantage of such O-rings and other readily resiliently deformed mountings proposed hitherto is that it is extremely difficult to retain positive and accurate location of the bearing outer member in its supporting structure, particularly so far as concerns co-axially with respect to a bore in which the bearing is positioned, and that the stiffness of the mounting is significantly lower than the "stiffness" of the bearing in the bearing gap.

It has hitherto been conventional to use metal for the construction of such bearing members. Development in the plastics industry has provided plastics materials which, given suitable dimensions, can provide the structural stability which is essential for a bearing element and a stiffness of the same order as the bearing "stiffness". We have surprisingly found that, by selecting for at least some of the material of the bearing element a flexural modulus and a specific gravity within the definitions given below, it is possible to retain adequate dimensional stability and stiffness but at the same time to obtain high absorption of energy within the material, and to obtain reduction or elimination of vibration and "whirl" in the bearing.

According to the present invention a bearing member, of a fluid rotary bearing for use at speeds in excess of the "half-speed whirl" speed of a solidly mounted bearing, comprises a substantially annular body formed at least partially, considered in the radial direction, of a material of which A. the tensile modulus lies in the range 75,000 and 1,500,000 pounds per square inch inclusive, and
B. the specific gravity is less than 3.

The bearing member is thus structurally stiff, whilst providing for high energy loss.

Where for reason of material compatability for high speed rubbing contact, wear resistance or other reason the bearing surfaces are formed as sleeves of hardened steel, ceramic or other suitable material well known in the art, the same structural accuracy, stiffness and whirl suppression characteristics can be achieved if the combined tensile modulus considered in the radial direction given by the formula $$1/E_c t_c = (1/E_s t_s) + (1/E_b t_b)$$

is maintained within the range 75,000 and 1,500,000 p.s.i. inclusive,
where
 $E$ = tensile modulus
 $t$ = thickness measured radially
and suffices
 $c$ = combined
 $s$ = sleeve
 $b$ = body,
and if the average specific gravity for the composite sleeve and body of the bearing is maintained below 3.

With such characteristics, the bering member tends to have a Young's Modulus which is usefully positioned intermediately in the range between those of relatively soft materials, such as rubber-like materials, and those of relatively soft materials, such as rubber-like materials, and those of relatively hard materials such as steel, so as to gain the advantageous feature of both types of material, i.e. it can retain a good energy absorbtion faculty whilst nevertheless having a faculty of keeping its dimensions with adequate precision and stiffness.

Moreover, the bearing member, which may have quite large dimensions for structural stability, may have a mass which, in relation to that of the shaft or other bearing member of the assembly, remains relatively low.

The annular bearing member may have radially projecting abutment portions, which may conveniently be integral, to obtain fluid-tight sealing in a support. The abutments may be formed from a common workpiece, or they may be made separately and either joined to the remainder of the bearing member or secured thereon, e.g. by locating means. The abutment portions may be spaced axially by air gaps.

The abutment portions may conveniently be arranged in axially-spaced groups of two or more abutments per group, and for example at main locations, say at or towards each of a cylindrical bearing member.

In a pressure-fed bearing assembly, an annular plenum chamber in the gas path to the bearing gap may conveniently be defined between the bore of a bearing structure and the annular bearing member, with each axial end sealed off by an abutment portion or a group of abutment portions.

Some materials which may be used are those which are well known in the plastics art as "engineering plastics", which are generally characterised by
 i. high dimensional stability,
 ii. being subject only to so-called "tough fracture" and not to "brittle fracture",
 iii. relatively great tensile strength.

In general these materials will exhibit the following typical properties:

|  |  |  | Test Method |
|---|---|---|---|
| Tensile strength | at 73° F | 2500 – 30,000 psi | D 638 |
| Elongation | at 73° F | > 3% | D 638 |
| Flexural Modulus | at 73° F | 90,000 – 1,500,000 psi | D 790 |
| Impact strength | at 73° F | > 0.5 ft lb/in | D 256 (Izod) |
| Hardness | 35 Rockwell R – 120 Rockwell M | | D 785 |
| Specific gravity | 0.8 – 2.5 | | |

Typical materials within this range of properties are: Acetal Resins, Acrynitrile Butadine Styrene, Ebonite, Epoxide Resins, Phenolic Resins, Polyamide Resins (Nylons), Polycarbonates, Polyimide Resins, Polysolfone Resins, Polytetrafluoroethylene Resins, these materials being either in their "natural" or "filled" states.

The improvement of this invention is applicable to aerodynamic, aerostatic, hydrostatic and hydrodynamic types of fluid bearings.

In order that the nature of the invention may be readily ascertaind, some embodiments of mounted fluid bearings, incorporating the improved bearing member, are hereinafter particularly described with reference to the accompanying drawings, wherein:

FIG. 1 is an axial section of a first embodiment of mounted bearing;

FIG. 2 is an axial section of a second embodiment of mounted bearing, suitable for use as a self-pressurised bearing;

FIG. 3 is an axial section of a third embodiment of mounted bearing, suitable for use as a single-row orifice-fed externally-pressurised bearing;

FIG. 4 is an axial section of a fourth embodiment of mounted bearing, in which a mounting body forming part of a bearing member fits into a housing with deformation, by bending, of abutment flanges;

FIG. 5 is a perspective view, with the components shown in separated condition, of an outer bearing member incorporating a shim to provide radial feeding slots for fluid.

Referring to FIG. 1, a support structure 1 has a cylindrical bore 2 within which there is positioned an annular body 3 forming the outer member of a fluid bearing. The inner member of the bearing is a shaft 4. Between the members 3 and 4 there is defined a bearing gap 5.

The bearing member 3 is made wholly of the kind of material specified herein as being suitable to provide adequate dimensional stability, whilst nevertheless having a faculty of absorbing energy for the purpose of reducing or eliminating whirl in the bearing. The material is also selected to be suitable for use as a bearing member without requiring a lining of other material at its inner face which bounds the bearing gap 5. However, such a lining, e.g. in the form of a relatively thin sleeve of metal or other material, could be provided in the manner shown at 10 in FIG. 2.

Referring to FIG. 2, a support structure 6 has a cylindrical bore 7 within which there is positioned an annular body 8, of a bearing member, having radial abutment portions 9 which serve as seals. Within the body 8 there is secured a cylindrical liner sleeve 10, and the body 8 and sleeve 10 together form the outer member of a self-pressurised fluid bearing. Between the sleeve 10, a shaft 11 forming the inner member of the bearing assembly, there is defined a bearing gap 12.

Referring to FIG. 3, which shows an arrangement for an orifice-fed externally-pressurised bearing, a housing 13 has a cylindrical bore 14 receiving an annular body 15 on which are integrally formed radial abutment portions 16 arranged in two pairs each spaced by air gaps, and serving as resiliently deformable seals. The housing 13 has a feed passage 17 leading to a plenum chamber 18, and one or more radial passages 19 lead to orifices 20 feeding gas to a bearing gap 21 defined between a bearing liner sleeve 22 and a shaft 23.

Referring to FIG. 4, a housing has a bore 25 receiving a body 26 having radial abutment members 27 at its axial ends. The members 27 are deformed, by bending, to permit the body 26 to be force fitted into the bore 25 of the housing 24, and to act as seals. This provides a convenient means of moulding an air seal. The body 26 supports an annular bearing element 26a, and the body 26 and element 26a together constitute a bearing member.

FIG. 5 shows an annular outer member, for a fluid bearing, constituted by two parts 28 and 29 which are adapted to be secured together by means of six screws 30 engaged through smooth holes 31 in the part 29 and screwed into threaded holes 32 in the part 28. The part 28 has an internal annular recess 33 the circumference of which is slightly greater than the external circumference 34 of the part 29. The part 28 has a radial face 35 which is opposed by a radial face 36 of the part 29. In the radial face 36 there is provided an annular recess 37. Between the parts 28 and 29 there is clamped a shim 38 of sheet metal, having radial passages 39 defined between fingers 40. The inner ends of the radial fingers 40 terminate just short of the internal face 41 of the parts 28 and 29. The part 28 has an external peripheral groove 42 from which fluid under pressure can pass to one or more radial passages 43 which open into the annular recess 37. From the recess 37, the fluid is fed to all of the radial passages 39 for slot-feed of the bearing fluid to a bearing gap defined between the internal face 41 and an inner bearing member (not shown) such as a rotatable shaft. In this construction, the parts 28 and 29 are made wholly of the kind of material specified herein as being suitable to provide adequate dimensional stability, whilst nevertheless having a faculty of absorbing energy for the purpose described.

Although the radial abutment members have been shown, in certain of the above-described embodiments, as projecting externally from the bearing member, they could project internally and/or externally thereof.

The flexural modulus is as defined in accordance with AMERICAN SOCIETY FOR TESTING MATERIALS (ASTM) Method D-790–49T.

The hardness is as defined in accordance with AMERICAN SOCIETY FOR TESTING MATERIALS (ASTM) Method D-785–51 (Method "A").

We claim:

1. A bearing member, of a fluid rotary bearing for use at speeds in excess of the "half speed whirl" speed of a solidly mounted bearing, comprising a substantially annular body formed at least partially, considered in the radial direction, of a material of which:

A. the tensile modulus lies in the range 75,000 and 1,500,000 pounds per square inch inclusive, and B. the specific gravity is less than 3.

2. A bearing member, as claimed in claim 1, incorporating a support body and a sleeve, and wherein:

i. the combined tensile modulus, considered in the radial direction, is derived from the modulus of the support body and from the modulus of the sleeve in accordance with the expression:

$$1/E_c t_c = (1/E_s t_s) + (1/E_b t_b)$$

wherein $E$ = tensile modulus $t$ = thickness measured radially and suffices $c$ = combined $s$ = sleeve $b$ = body, ii. the average specific gravity for the body and sleeve of the composite bearing member is below 3.

3. A bearing member, as claimed in claim 1, having radially projecting abutment portions spaced axially by air gaps to serve as sealing means.

4. A bearing member, as claimed in claim 2, having radially projecting abutment portions spaced axially by air gaps to serve as sealing means.

5. A bearing member, as claimed in claim 3, which includes passage means providing communication between (a) a face thereof bounding a bearing gap and (b) a zone defined between spaced abutments, whereby said zone may serve as a plenum chamber.

6. A bearing member, as claimed in claim 4, which includes passage means providing communication between (a) a face thereof bounding a bearing gap and (b) a zone defined between spaced abutments, whereby said zone may serve as a plenum chamber.

7. In combination in a fluid rotary bearing, a support and a bearing assembly including a bearing member as claimed in claim 3, said bearing member being force fitted, with resilient deformation of said abutments, into contact with the inner surface of said support.

8. In combination in a fluid rotary bearing, a support and a bearing assembly including a bearing member as claimed in claim 4, said bearing member being force fitted, with resilient deformation of said abutments, into contact with the inner surface of said support.

* * * * *